United States Patent
Tuinman et al.

(10) Patent No.: US 6,344,494 B1
(45) Date of Patent: Feb. 5, 2002

(54) USE OF LOW UNSATURATED POLYETHER POLYOLS IN SLABSTOCK FOAM APPLICATIONS

(75) Inventors: Roeland Tuinman, Novi, MI (US); Thomas L. Fishback, Cuyahoga Falls, OH (US); Curtis J. Reichel, Southgate, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/579,239

(22) Filed: May 24, 2000

(51) Int. Cl.$^7$ ................................................ C08G 18/14
(52) U.S. Cl. ........................ 521/174; 521/130; 521/170
(58) Field of Search ................................. 521/170, 174, 521/130

(56) References Cited

U.S. PATENT DOCUMENTS

| | | |
|---|---|---|
| 1,922,459 A | 8/1933 | Schmidt |
| 4,458,038 A | 7/1984 | Ramlow et al. |
| 4,661,531 A | 4/1987 | Davis et al. |
| 4,689,354 A | 8/1987 | Ramlow et al. |
| 4,690,956 A | 9/1987 | Ramlow et al. |
| RE33,291 E | 8/1990 | Ramlow et al. |
| 5,010,117 A | 4/1991 | Herrington et al. |
| 5,070,114 A | 12/1991 | Watts et al. |
| 5,300,535 A | 4/1994 | Takeyasu et al. |
| 5,491,177 A | 2/1996 | De Witte |
| 5,563,221 A | 10/1996 | Pazos |
| 5,565,498 A * | 10/1996 | Chaffanjon et al. ......... 521/155 |
| 5,605,939 A | 2/1997 | Hager |
| 5,621,016 A | 4/1997 | Murty et al. |
| 5,648,447 A | 7/1997 | Seneker et al. |
| 5,648,559 A | 7/1997 | Hager |
| 5,700,847 A | 12/1997 | Thompson |
| 5,863,961 A * | 1/1999 | Jacobs et al. ............... 521/174 |
| 5,900,441 A | 5/1999 | De Witte et al. |
| 5,965,778 A | 10/1999 | Allen et al. |

* cited by examiner

Primary Examiner—John M. Cooney, Jr.
(74) Attorney, Agent, or Firm—Fernando A. Borrego; Mary K. Cameron

(57) ABSTRACT

The present invention discloses a method for the formation of a flexible slabstock polyurethane foam having substantially improved indentation force deflection and resilience characteristics while maintaining the other physical properties. The method comprises the steps of reacting a triol polyoxyalkylene polyether polyol having a plurality of internal blocks formed from oxyalkylene monomers with a plurality of terminal caps comprising ethylene oxide attached to said plurality of internal blocks, the internal blocks containing at least 80% by weight propylene oxide based on the total weight of all of the oxyalkylenes in said internal blocks and the amount of ethylene oxide in the terminal caps comprising from 5 to 25% by weight based on the total weight of the polyol, said polyol having a degree of unsaturation of less than or equal to 0.015 meq/g KOH with a polyisocyanate component in the presence of a catalyst and water as a blowing agent at a level of between 3 to 7% by weight.

16 Claims, No Drawings

USE OF LOW UNSATURATED POLYETHER POLYOLS IN SLABSTOCK FOAM APPLICATIONS

BACKGROUND OF THE INVENTION

This invention relates generally to a method for producing slabstock polyurethane foams and, more particularly, to the use of very low unsaturated polyether polyols for the production of slabstock polyurethane foams.

Polyols are generally defined as compounds that include a plurality of hydroxyl groups. Polyols having at least two isocyanate-reactive hydrogen atoms, particularly polyether polyols, are useful when combined with polyisocyanates to form polyurethanes. Polyols can be combined with polyisocyanates in the presence of catalysts and blowing agents to form either rigid or flexible foams. Flexible polyurethane foams are distinct from rigid foams. Flexible foams typically have a limited resistance to an applied load, are open-celled, permeable to air and are reversibly deformable. Flexible foams can either be formed in a discontinous molding process or through a continuous slabstock process. In the continuous slabstock process, typically, the components are rapidly mixed together and extruded onto a moving bed reactor where the foam is permitted to freely rise to its final height. After the foam has fully risen it is processed to the desired final dimensions. Flexible foams are particularly useful in seating applications, carpet padding and other applications requiring reversible deformation of the foam.

Two important properties of flexible slabstock foam are its indentation force deflection and resilience. Many current flexible slabstock foam formulations suffer from less than ideal indentation force deflection and resilience properties. It would be advantageous to provide a flexible slabstock formulation having improved indentation force deflection and resilience properties

SUMMARY OF THE INVENTION

In general terms, this invention provides a method for making a flexible slabstock polyurethane foam using very low unsaturated polyether polyols. The foam produced by the method has substantially improved indentation force deflection and resilience properties while maintaining the other physical properties of the foam when compared to foam made with a polyol having higher unsaturation levels. These improved properties greatly enhance the foam's load-building characteristics.

In one embodiment, the present invention is a method for the formation of a slabstock polyurethane foam comprising the steps of: providing a triol polyoxyalkylene polyether polyol having a plurality of internal blocks formed from oxyalkylene monomers with a plurality of terminal caps comprising ethylene oxide attached to said plurality of internal blocks, the internal blocks containing at least 80% by weight propylene oxide based on the total weight of all of the oxyalkylenes in said internal blocks and the amount of ethylene oxide in the terminal caps comprising from 5 to 25% by weight based on the total weight of the polyol, said polyol having a degree of unsaturation of less than or equal to 0.015 meq/g KOH; providing a toluene diisocyanate component; providing a catalyst; providing water as a blowing agent at a level of between 3 to 7 % by weight; and combining the polyol with the toluene diisocyanate component, the catalyst and the water to form a slabstock polyurethane foam.

In another embodiment, the present invention is a slabstock polyurethane foam comprising the reaction product of: a triol polyoxyalkylene polyether polyol having a plurality of internal blocks formed from oxyalkylene monomers with a plurality of terminal caps comprising ethylene oxide attached to said plurality of internal blocks, said internal blocks containing at least 80% by weight propylene oxide based on the total weight of all of said oxyalkylenes in said internal blocks and an amount of ethylene oxide in said terminal caps comprising from 5 to 25% by weight based on the total weight of said polyol, said polyol having a degree of unsaturation of less than or equal to 0.015 meq/g KOH combined with a toluene diisocyanate component in the presence of a catalyst, water at a level of between 3 to 7% by weight as a blowing agent, and, optionally, one or more surfactants.

Polyurethane foams produced using the method of the present invention have substantially improved indentation force deflection and resilience characteristics compared to a foam made with a similar polyol having a higher degree of unsaturation. The improved properties do not come at the expense of other physical characteristics of the foam, these are maintained.

These and other features and advantages of this invention will become more apparent to those skilled in the art from the following detailed description of the presently preferred embodiment.

DETAILED DESCRIPTION OF A PREFERRED EMBODIMENT

The flexible slabstock polyurethane foams of the present invention are prepared by combining a very low unsaturated polyoxyalkylene polyether polyol with a toluene diisocyanate component in the presence of a catalyst and water as a blowing agent. The foams optionally include other additives such as, for example, chain extenders/crosslinkers, surface-active substances, flame retardants, and fillers.

Methods of forming polyoxyalkylene polyether polyols are well known, for example, by the base catalyzed addition of alkylene oxides to an initiator molecule containing reactive hydrogens such as a polyhydric alcohol. In one embodiment of the present invention, the initiator molecules are triols. Examples of such initiators include: glycerol; 1,1,1-trimethylolpropane; 1,1,1-trimethylolethane; 1,2,6-hexanetriol; pentaerythritol; and sorbitol. Other suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol. Also included within the term "polyhydric alcohol" are compounds derived from phenol such as 2,2-bis(4-hydroxyphenyl)propane, commonly known as Bisphenol A. The polyether polyols may be prepared by any known process such as, for example, the process disclosed by Wurtz in 1859, *Encyclopedia of Chemical Technology*, Vol. 7, pp. 257–262, Published by Interscience Publishers, Inc. (1951) or in U.S. Pat. No. 1,922,459.

Examples of useful alkylene oxides include ethylene oxide, propylene oxide, butylene oxide, amylene oxide, mixtures thereof, tetrahydrofuran, alkylene oxide-tetrahydrofuran mixtures, epihalohydrins, and aralkylene styrene. The alkylene oxides are added onto the initiator molecule and chain propagation is carried out in the presence of catalysts by either anionic polymerization or by cationic polymerization.

The preferred catalysts are potassium hydroxide, sodium hydroxide, alcoholates of potassium hydroxide, alcoholates of sodium hydroxide, cesium catalysts, amines, Lewis acid catalysts, or double metal complex catalysts, all of which are known in the art.

Polyols useful in the present invention preferably comprise triol polyoxyalkylene polyether polyols that have the structure of a plurality of internal blocks formed from oxyalkylene monomers attached to the initiator molecule. The internal blocks may include any of the above referenced oxyalkylenes. In one embodiment at least 80% by weight of the internal blocks comprise propylene oxide based on the total weight of all the oxyalkylenes in the internal blocks. Attached to the plurality of internal blocks are a plurality of ethylene oxide terminal caps. The terminal caps comprise ethylene oxide in an amount from 5 to 25% by weight based on the total weight of the polyol. In addition, polyols used in the present invention have a very low degree of unsaturation, namely, an unsaturation of less than or equal to 0.015 meq/gKOH. It is further preferred that the polyols used in the present invention have a hydroxyl equivalent weight of at least 1,000 Daltons. In addition, it is preferred that polyols used in the present invention have a hydroxyl number of between 40 to 250 mg KOH/g. The isocyanate component is preferably a polyisocyanate, herein defined as having 2 or more isocyanate functionalities, examples of these include conventional aliphatic, cycloaliphatic, and preferably aromatic isocyanates. Specific examples include: alkylene diisocyanates with 4,2,12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures 4,4'-2,2'- and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2'-diphenylmethane diisocyanates and polyphenylene polymethylene polyisocyanates (crude MDI). In one embodiment, the isocyanate component is a toluene diisocyanate. The isocyanate component may comprise any suitable toluene diisocyanate including, for example, 2,4-toluene diisocyanate; 2,6-toluene diisocyanate and the like. Particularly suitable mixtures are those containing from about 65 to about 80% 2,4-toluene diisocyanate and the balance 2,6-toluene diisocyanate. Commercially available mixtures containing about 80% of 2,4- and about 20% of 2,6-toluene diisocyanate are most preferred. Generally the isocyanate and the polyol resin are combined at an isocyanate index of from 90 to 120.

The catalysts used for the preparation of the slabstock polyurethane foams are, in particular, compounds that strongly accelerate the reaction of the hydroxyl groups of the polyol with the toluene diisocyanate component. Suitable catalysts are organic metal compounds, preferably organic tin compounds such as tin (II) salts of organic carboxylic acids, e.g., tin (II) acetate, tin (II) octoate, tin (II) ethylhexanate and tin (II) laurate, and the dialkyltin (IV) salts of organic carboxylic acids, e.g., dibutyltin diacetate, dibutyltin dilaurate, dibutyltin maleate, and dioctyltin diacetate. The organic metal compounds are used alone or preferably in combination with strongly basic amines. Examples which may be mentioned are amines such as 2,3-dimethyl-3,4,5,6-tetrahydropyrimidine or tertiary amines such as triethylamine, tributylamine; dimenthylbenzylamine; N-methylmorpholine; N-ethylmorpholine; N-cyclohexylmorpholine; N,N,N',N'-tetramethylethylenediamine; N,N,N',N'-tetramethylbutanediamine; N,N,N',N'-tetramethylhexane-1,6-diamine; pentamethyldiethylenetriamine; bis (dimethylaminoethyl) ether; bis (dimethylaminopropyl) urea; dimethylpiperazine; 1,2-dimethylimidazole; 1-azabicyclo[3.3.0]octane and preferably 1,4-diazabicyclo [2.2.2]octane. Additionally, one can use alkanolamine compounds such as triethanolamine; triisopropanolamine; N-methyldiethanolamine and N-ethyldiethanolamine and dimethylethanolamine.

Additional suitable catalysts include: tris (dialkylaminoalkyl)-s-hexahydrotriazines, in particular tris (N,N-dimethylarninopropyl)-s-hexahydrotriazine; tetraalkylammonium hydroxides such as tetramethylammonium hydroxide; alkali metal hydroxides such as sodium hydroxide and alkali metal alkoxides such as sodium methoxide and potassium isopropoxide and also alkali metal salts of long-chain fatty acids having from 10 to 20 carbon atoms and possibly lateral OH groups in combinations of the organic metal compounds and strongly basic amines. Preference is given to using from 0.001 to 5% by weight, in particular from 0.05 to 2% by weight, of catalysts or catalyst combination, based on the weight of the polyol.

One of the especially preferred additives are compounds comprising silicon atoms and polyether chains. These additives are preferably used in an amount of from 0.5 to 5% by weight, based on the total weight of the polyol. These compounds are silicone-polyether copolymers. The products have an average molecular weight of about 8,000, with the molecular weight distribution being relatively broad. The siloxane chain has an average length of about 40 $(CH_3)_2SiO$ units and has an average of 5 polyether chains linked to it. The polyether chains preferably comprise ethyleneoxide and propyleneoxide in a ratio of 1:1 and have a hydroxyl group at the end. The molecular weight of the polyether chains is about 1,500. Such products are commercially available and are sold, for example, by Goldschmidt A.G. under the name Tegostab™.

Suitable surface-active substances that may also be added include, for example, compounds, which serve to aid the homogenization of the starting materials and also may be suitable for regulating the cell structure. Examples which may be mentioned are emulsifiers such as the sodium salts of castor oil sulfates or fatty acids and also amine salts of fatty acids, e.g. Diethylamine oleate, diethylamine sterate, diethylamine ricinoleate, salts of sulfonic acid, e.g. Alkali metal or ammonium salts of dodecylbenzene-or dinaphthylmethanedisulfonic acid and ricinoliec acid; foam stabilizers such as siloxane-oxyalkylene copolymers and other organopolysiloxanes, ethoxylated alkylphenols, ethoxylated fatty alcohols, paraffin oils, castor oil or ricinoliec esters, Turkey red oil and peanut oil. Additives may also include cell regulators such as paraffins, fatty alcohols, dimethylpolysiloxanes. Oligomeric polyacrylates having polyoxyalkane and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the components other than the isocyanate component.

Suitable chain extender/crosslinkers that may be used include diols and/or triols having molecular weights of less than about 400. Examples of suitable chain extenders/crosslinkers are aliphatic, cycloaliphatic and/or aromatic diols having from 2 to 14, preferably from 4 to 10, carbon atoms, e.g., ethylene glycol; 1,3-propanediol; 1,10-decanediol; o-, m-, p-dihydroxycyclohexane; diethylene glycol; dipropylene glycol, and preferably 1,4-butanediol, 1,6-hexanediol and bis(2-hydroxyethyl) hydroquinone, triols such as 1,2,4- and 1,3,5-trihydroxyclylohexane, and low melecular weight hydroxyl-containing polyalkylene oxides based on ethylene oxide and/or 1,2-propylene oxide in the above-mentioned diols and/or triols as initiator molecules. These compounds are preferably used in amounts of from 0 to 20% by weight based on the total weight of the polyol.

Flame retardants that may be used include pentabromodiphenyl oxide; dibromopropanol; tris (β-chloropropyl) phosphate; 2,2-bis(bromoethyl)1,3-propanediol; tetrakis (2-chloroethyl) ethylene diphosphate; tris(2,3-dibromopropyl)phosphate; tris(β-chloroethyle) phosphate; tris(1,2-dichloropropyl)phosphate; bis-(2-chloroethyl)2-chloroethylphosphonate; molybenumtrioxide; ammonium molybdate; ammonium phosphate; pentabromodiphenyloxide; tricresyl phosphate; hexabromocyclododecane; melamine; and dibromoethyldibromocyclohexane. Concentrations of flame retardant compounds, which may be employed range from 50 to 25 parts per 100 parts of polyol.

The foam may further include fillers such as organic, inorganic and reinforcing fillers. Specific examples are: inorganic fillers such as siliceous minerals, for example, sheet silicates such as antigorite, serpentine, hornblends, amphiboles, chrysotile, zeolites, talc; metal oxides, such as kaolin, aluminum oxides, titanium oxides and iron oxides, meta salts, such as chalk, barite, aluminum silicates and inorganic pigments such as cadmium sulfide, zinc sulfide, and also glass particles. Examples of organic fillers are: carbon black, melamine, rosin, cyclopentadienyl resins. The organic and inorganic fillers can be used individually or as mixtures and are advantageously incorporated into the reaction mixture in amounts of from 0.5 to 50% by weight based on the weight of the polyol and the isocyanate component.

To form the foam of the present invention the polyol, catalyst, water, and any other additional components are premixed to form a resin. Shortly after formation of the resin, the resin is combined in a mixhead with the toluene diisocyanate component and the mixture is extruded onto a moving bed reactor. As the foam travels down the moving bed reactor it rises and cures. The cured foam is then processed as necessary. The method of forming a slabstock foam is known to one of ordinary skill in the art.

COMPARATIVE EXAMPLE 1 AND TEST SAMPLE 1

| Component | Parts by Weight Comparative Example 1 | Test Sample 1 |
|---|---|---|
| Polyol A | 100 | 0 |
| Polyol B | 0 | 100 |
| T10 | 0.5 | 0.2 |
| DABCO 33 LV | 0.25 | 0.25 |
| A-1 | 0.04 | 0.04 |
| Tegostab ® BF-2370 | 1.2 | 1.2 |
| Water | 5.6 | 5.6 |
| Toluene Diisocyanate | 66.4 | 66.4 |
| Isocyanate Index | 105 | 105 |

Polyol A is a triol glycerin initiated polyol having an unsaturation of 0.025, a molecular weight of 3,000, and it is a randomly polymerized ethylene oxide and propylene oxide polyol with at least 80% propylene oxide.

Polyol B is a triol glycerin initiated polyol having an unsaturation of 0.012 and a molecular weight of 3,000. The polyol has an internal block of randomly polymerized propylene oxide and ethylene oxide with at least 80% propylene oxide and an ethylene oxide terminal cap.

T10 is a 50% mixture of stannous octoate in dioctylphthalate.

DABCO 33 LV is a dipropylene glycol solution containing 33% triethylenediamine.

A-1 is a 70% solution of bis-(dimethylaminoethyl) ether in dipropylene glycol.

Tegostab® BF-2370 is a silicone surfactant available from GoldSchmidt.

The toluene diisocyanate was an 80:20 mixture of 2,4-toluene diisocyanate and 2,6-toluene diisocyanate. All the components except the toluene diisocyanate of each foam were premixed and then components were mixed with the toluene diisocyanate and the foams were allowed to free rise and cure.

| Measured Factor | Comparative Example 1 | Test Sample 1 |
|---|---|---|
| Core Density (pcf) | 1.16 | 1.23 |
| Original 25% Indentation Force Deflection (IFD), lbs. | 38.5 | 43.3 |
| Original 65% IFD, lbs. | 68.3 | 74.5 |
| Original 25% RT IFD, lbs. | 23.1 | 27.0 |
| Sag Factor | 1.77 | 1.72 |
| Percent Recover | 60.0 | 62.3 |
| Presser Foot Size | 50 | 50 |
| Air Flow, cfm | 4.9 | 4.2 |
| Original Peak Tensile, psi | 13.4 | 14.8 |
| Original Break Elongation Percent | 107.7 | 102.0 |
| Heat Aged Peak Tensile | 15.5 | 13.2 |
| Falling Ball Resilience | 39 | 45 |
| Compression Load Deflection 50%, Original Humid Aged | 0.57 | 0.53 |
| Compression Load Deflection 50 % Humid Aged | 0.53 | 0.47 |
| Compression Load Deflection 50% Humid Aged Percent of Original | 91.5 | 88.1 |
| Compression Load Deflection 50% Original Heat Aged | 0.59 | 0.55 |
| Compression Load Deflection 50% Heat Aged | 0.55 | 0.59 |
| Compression Load Deflection 50% Heat Aged Percent of Original | 92.7 | 106.7 |
| Compression Set Original 50% | 6.2 | 9.9 |
| Compression Set Original 90% | 6.0 | 7.0 |
| Compression Set Humid Aged 50% | 10.3 | 22.2 |
| Compression Set Humid Aged 90% | 8.5 | 20.5 |

The data clearly shows the advantage of using the very low unsaturated polyether polyols. Foam prepared with the very low unsaturated polyether polyol has significantly improved IFD values at 25%, 65% and 25% RT IFD. In addition, the test sample has significantly improved resilience properties. The table furthermore demonstrates that the other physical properties of Sample 1 are not significantly different from that of comparative Example 1. Thus, inclusion of this very low unsaturated polyether polyol provides a foam having many of the physical characteristics of foams made with commonly used polyols but improve indentation force deflection and resilience characteristics.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for the formation of a slabstock polyurethane foam comprising the steps of:
   a) providing a triol polyoxyalkylene polyether polyol having a plurality of internal blocks formed from oxyalkylene monomers with a plurality of terminal caps comprising ethylene oxide attached to said plurality of internal blocks, the internal blocks containing at least 80% by weight propylene oxide based on the total weight of all of the oxyalkylenes in said internal blocks and the amount of ethylene oxide in the terminal caps comprising from 5 to 25% by weight based on the total weight of the polyol, said polyol having a degree of unsaturation of less than or equal to 0.015 meq/g KOH;
   b) providing a polyisocyanate component;
   c) providing a catalyst;
   d) providing water as a blowing agent at a level of between 3 to 7% by weight based on the total weight of the polyol; and
   e) combining the polyol with the polyisocyanate component, the catalyst and the water to form a slabstock polyurethane foam having a core density of from 1.1 to 2.0 pounds per cubic foot.

2. A method as recited in claim 1 wherein step e) comprises reacting the polyol and the polyisocyanate component at an isocyanate index of from 90 to 120.

3. A method as recited in claim 2 wherein step e) comprises reacting the polyol and the polyisocyanate component at an isocyanate index of from 100 to 115.

4. A method as recited in claim 1 wherein step a) comprises providing a triol polyoxyalkylene polyether polyol having a hydroxy equivalent molecular weight of at least 1000 Daltons.

5. A method as recited in claim 1 wherein step b) comprises providing a toluene diisocyanate or a mixture of toluene diisocyanates as the polyisocyanate component.

6. A method as recited in claim 5 wherein step b) comprises providing a mixture of toluene diisocyanates comprising an 80/20 mixture of 2,4-toluene diisocyanate and 2,6-toluene diisocyanate.

7. A method as recited in claim 1 further comprising blending at least one surfactant with the polyol, then reacting the blend with the polyisocyanate component in the presence of the catalyst and the water to form a slabstock polyurethane foam.

8. A method as recited in claim 7 comprising blending a silicone surfactant with the polyol, then reacting the blend with the polyisocyanate component in the presence of the catalyst and the water to form a slabstock polyurethane foam.

9. A method as recited in claim 1 wherein step a) comprises providing a triol polyoxyalkylene polyether polyol having a plurality of internal blocks formed from oxyalkylene monomers with a plurality of terminal caps comprising ethylene oxide attached to said plurality of internal blocks, the internal blocks comprising a random heteric mixture of ethylene oxide and propylene oxide with the internal blocks having at least 80% by weight propylene oxide based on the total weight of all of the oxyalkylenes in said internal blocks and the amount of ethylene oxide in the terminal caps comprising from 5 to 25% by weight based on the total weight of the polyol, said polyol having a degree of unsaturation of less than or equal to 0.015 meq/g KOH.

10. A slabstock polyurethane foam comprising the reaction product of:
   a) a triol polyoxyalkylene polyether polyol having a plurality of internal blocks formed from oxyalkylene monomers with a plurality of terminal caps comprising ethylene oxide attached to said plurality of internal blocks, said internal blocks containing at least 80% by weight propylene oxide based on the total weight of all of said oxyalkylenes in said internal blocks and an amount of ethylene oxide in said terminal caps comprising from 5 to 25% by weight based on the total weight of said polyol, said polyol having a degree of unsaturation of less than or equal to 0.015 meq/g KOH; and
   b) a polyisocyanate component in the presence of;
   c) a catalyst;
   d) water as a blowing agent at a level of between 3 to 7% by weight based on the total weight of the polyol; and
   e) optionally one or more surfactants;
wherein said slabstock polyurethane foam has a core density of 1.1 to 2.0 pounds per cubic foot.

11. A slabstock polyurethane foam as recited in claim 10 wherein said plurality of internal blocks comprises a heteric random mixture of propylene oxide and ethylene oxide with said internal blocks containing at least 80% by weight propylene oxide based on the total weight of all of said oxyalkylenes in said internal blocks.

12. A slabstock polyurethane foam as recited in claim 10 wherein said polyol and said polyisocyanate component are reacted at an isocyanate index of from 90 to 120.

13. A slabstock polyurethane foam as recited in claim 10 wherein said polyol has a hydroxy equivalent weight of at least 1000 Daltons.

14. A slabstock foam as recited in claim 10 wherein said polyisocyanate component comprises a toluene diisocyanate or a mixture of toluene diisocyanates.

15. A slabstock foam as recited in claim 10 wherein said polyisocyanate component consists of an 80/20 mixture of 2,4toluene diisocyanate and 2,6-toluene diisocyanate.

16. A slabstock foam as recited in claim 10 comprising a silicone surfactant.

* * * * *